United States Patent
Ferguson et al.

(10) Patent No.: US 6,375,266 B1
(45) Date of Patent: Apr. 23, 2002

(54) BREAKAWAY FOOTREST

(75) Inventors: Jason R. Ferguson, Northville; Eric M. May, Sterling Heights; James A. Dykla, Livonia, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/765,007

(22) Filed: Jan. 18, 2001

(51) Int. Cl.$^7$ ................................................. A47C 7/50
(52) U.S. Cl. ............................ 297/423.15; 297/423.26; 297/423.27
(58) Field of Search ....................... 297/423.15, 423.26, 297/423.27

(56) References Cited

U.S. PATENT DOCUMENTS

| | | |
|---|---|---|
| 895,632 A | 8/1908 | Harris |
| 956,326 A | 4/1910 | Fitzsimons |
| 961,860 A | 6/1910 | Huff |
| 1,268,811 A | 6/1918 | Balmos |
| 1,389,209 A | 8/1921 | Myatt |
| 2,257,150 A * | 9/1941 | Beeson .................. 297/423.15 |
| 2,284,129 A * | 5/1942 | Caesar ................... 297/423.15 |
| 2,561,091 A * | 7/1951 | Bell ....................... 297/423.15 |
| 2,591,598 A * | 4/1952 | Owler .................... 297/423.15 |
| 2,728,380 A | 12/1955 | Powers |
| 3,982,787 A | 9/1976 | Moll |
| 5,044,683 A | 9/1991 | Parsson |
| 5,810,416 A | 9/1998 | Hashimoto |
| 6,000,751 A | 12/1999 | Kato et al. |
| 6,059,364 A | 5/2000 | Dryburgh et al. |

* cited by examiner

Primary Examiner—Anthony D. Barfield
(74) Attorney, Agent, or Firm—Price, Heneveld, Cooper, DeWitt & Litton

(57) ABSTRACT

A footrest is mounted to the frame of a forward seat and is pivotally mounted thereto to be movable between a raised stored position adjacent the back of the seat to a lowered use position for supporting a second row passenger's feet. The footrest responds to a force above a predetermined level to breakaway to the footrest which can be subsequently returned to the use or stored position. In a preferred embodiment of the invention, the footrest comprises a generally U-shaped member having a mounting bracket including the pivot coupling to opposite ends of the member to allow such pivotal movement. In addition, the mounting bracket and U-shaped footrest include a deformable stop extending between the two which holds the footrest in a use position and allows the footrest to pivot downwardly if an excessive force is placed thereon.

22 Claims, 4 Drawing Sheets

BREAKAWAY FOOTREST

BACKGROUND OF THE INVENTION

The present invention relates to a footrest for a vehicle and particularly a footrest with a breakaway feature.

When traveling in a vehicle, such as an automobile, second row occupants and particularly those with smaller stature can suffer discomfort due to thigh pressure when their feet cannot rest comfortably on the vehicle floor. The problem can be particularly acute with older occupants when traveling long distances, such as on vacations. Although portable footrests are available which rest upon the floor of the vehicle, such footrests take up valuable space and cannot be stored when not in use without taking up valuable storage space in the vehicle. Some airline passenger seats include swing-down footrests which store in a raised position behind the back of a seat in front of the user and swing down to a use position. Although such construction provides some airline travelers with greater foot comfort, the cost of such heavy duty commercial footrests would be prohibitive in the competitive automotive market which is increasingly cost conscious for comfort accessories. In the confined space of a vehicle, second row seat passengers who want to shift their weight by pressing against the footrest to move could break or deform a footrest if not a heavy duty construction.

Thus, there exists a need for a footrest which will accommodate the economics of the automotive environment, as well as provide comfort to a second row seat passenger, and which can be stored in an out-of-the-way position to maximize the convenience of ingress and egress and not restrict the usable area of a vehicle when not in use.

SUMMARY OF THE INVENTION

The footrest of the present invention accommodates these needs by providing a footrest which is mounted to the support frame of a forward seat and which is pivotally mounted thereto to be movable between a raised stored position adjacent the back of the seat to a lowered use position for supporting a second row passenger's feet. The footrest responds to a force above a predetermined level to breakaway to prevent damage to the footrest which can be subsequently returned to the use or stored position. In a preferred embodiment of the invention, the footrest comprises a generally U-shaped member having a mounting bracket including a pivot coupling to opposite ends of the frame to allow such pivotal movement. In addition, the mounting bracket and U-shaped member include a deformable stop extending between the two which holds the footrest in a use position but allows the footrest to pivot downwardly and breakaway if an excessive force is placed thereon. In a preferred embodiment of the invention also, the foot-contacting section of the generally U-shaped footrest is covered with an elastomeric material to provide greater comfort and frictional contact for the user's feet.

These and other features, objects and advantages of the present invention will become apparent upon reading the following description thereof together with reference to the accompanying drawings.

DETAILED DESCRIPTION OF THE PREFERRED EMBODIMENT

Figure 1:
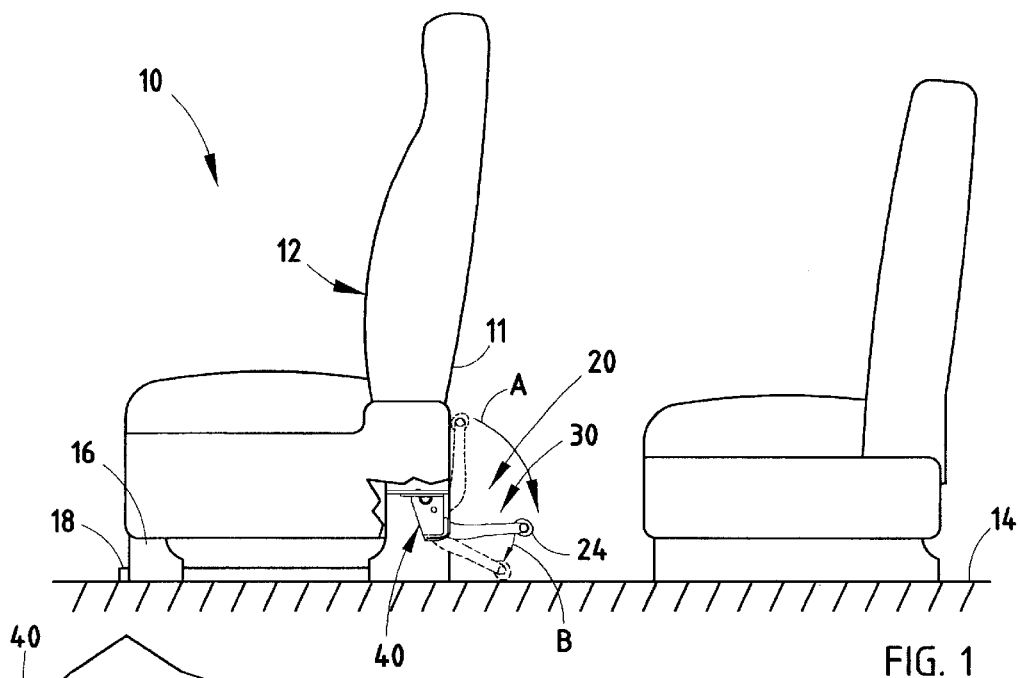
FIG. 1 is a fragmentary side elevational view of a vehicle incorporating the footrest of the present invention, shown in three positions.
Figure 3:
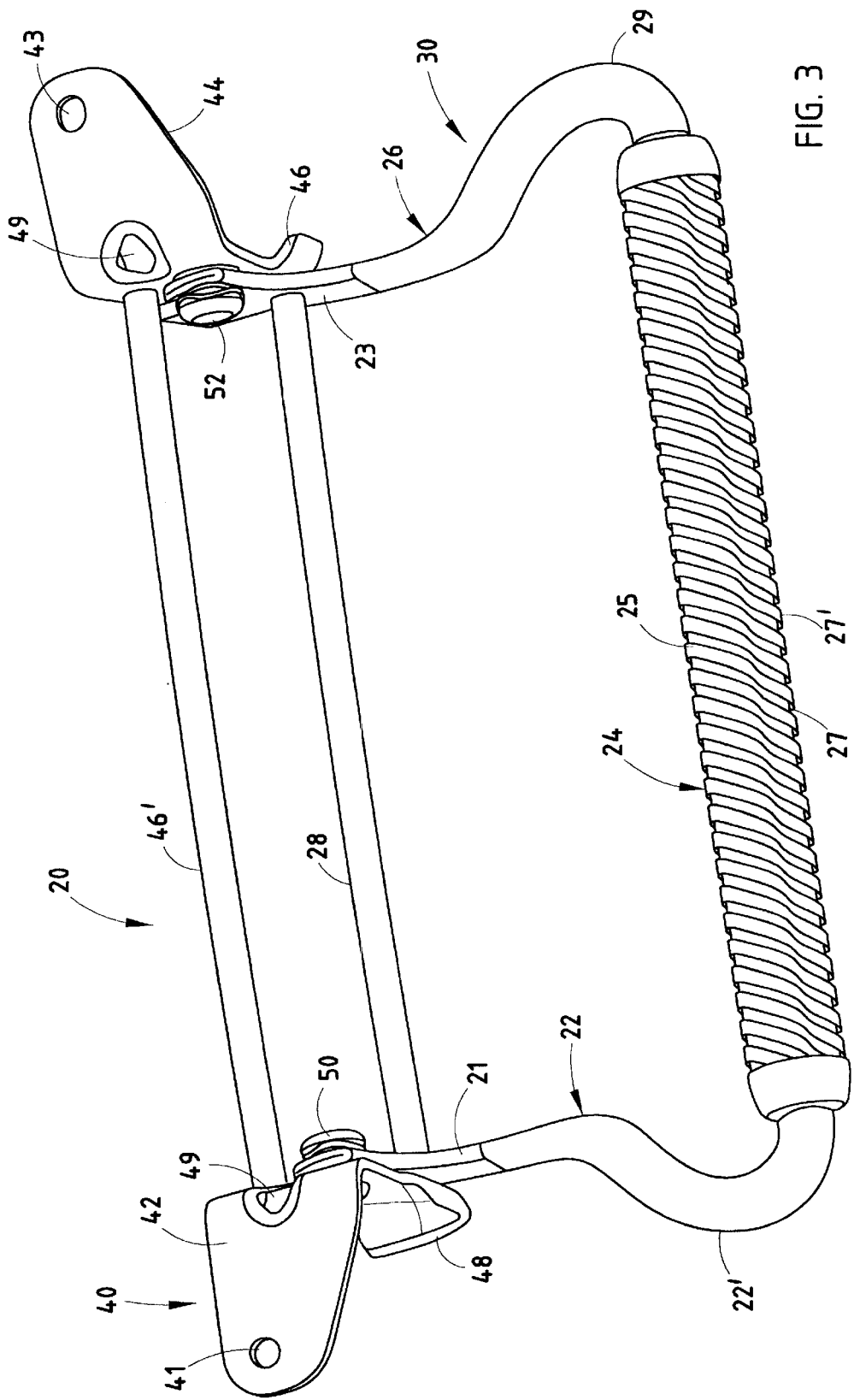
FIG. 3 is a perspective view of the footrest assembly of the present invention.
Figure 4:
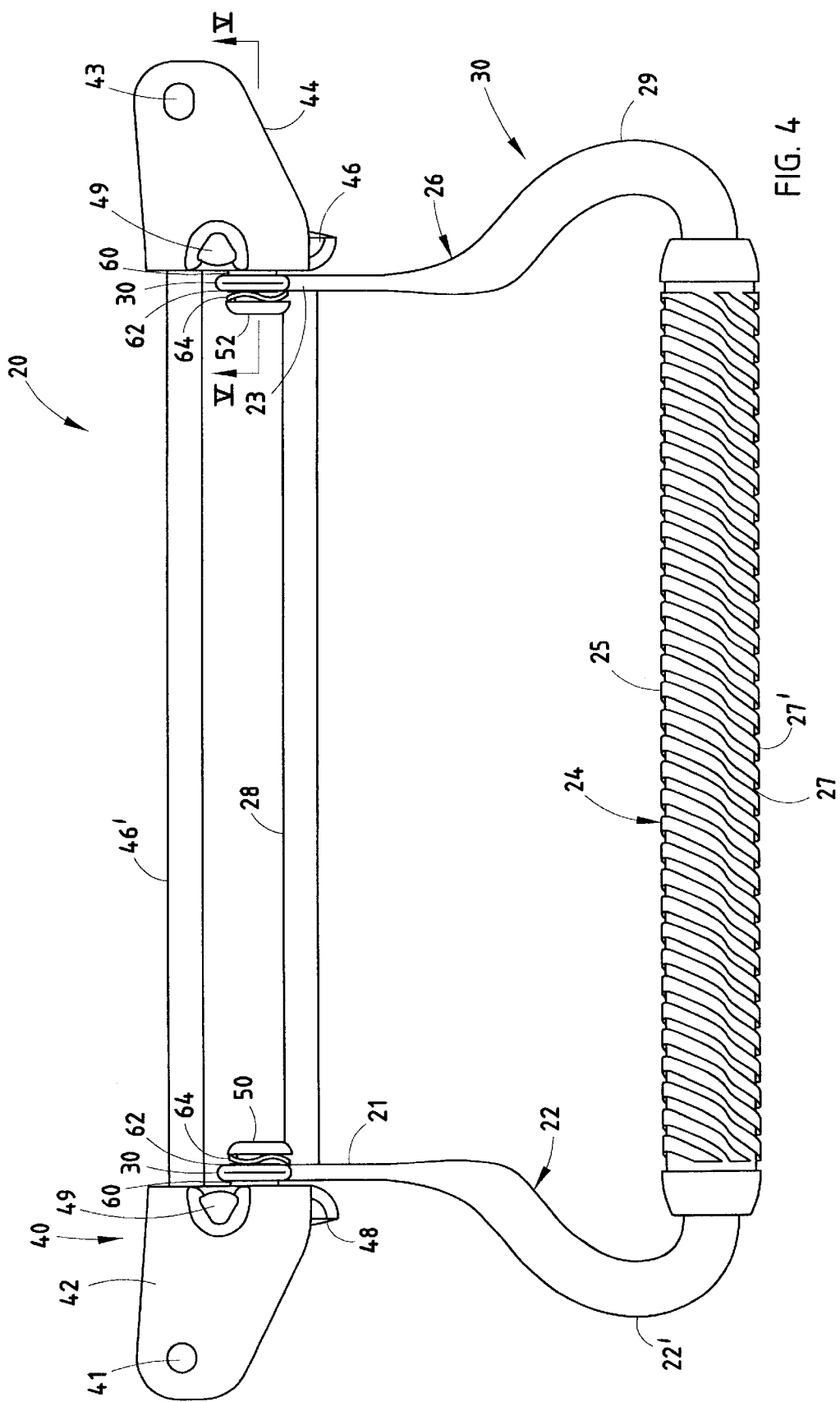
FIG. 4 is a top plan view of the footrest shown in FIG. 3.

Referring initially to FIG. 1, there is shown a vehicle 10, such as an automobile, van, or other vehicle which has multiple rows of seating. In FIG. 1, there is shown a front row seat 12, such as a driver's seat, which is mounted to the floor 14 of vehicle 10 by a mounting bracket 16 typically movably attached to support rails 18 to allow adjustment of the position of the seat forwardly and rearwardly. Attached to the seat mounting bracket 16 is the footrest assembly 20 of the present invention which includes a generally U-shaped footrest 30 (FIGS. 3 and 4) rotatably mounted to a mounting bracket 40 which, in turn, is secured to the seat mounting bracket 16. The footrest 30 can be rotated from a generally vertical stored position shown in phantom lines in FIGS. 1 and 2 in which it is adjacent the rear surface area 11 of the seat 12 and rotated downwardly through an angle of approximately 90° to 120° in the direction indicated by arrow A to a use position shown in solid lines in FIGS. 1 and 2 in which it is held by a breakaway contact with bracket 40, as described below. If excessive force is placed upon the footrest, it breaks away and rotates downwardly until it rests against the vehicle floor 14 as indicated by arrow B in FIGS. 1 and 2. The footrest assembly 20 is shown in detail in FIGS. 2–5 now described.

Footrest assembly 20 includes a generally U-shaped footrest 30 being integrally formed of a stamped steel tubular member with a first leg 22 terminating in a flattened end 21 which is rotatably mounted to a first end of bracket 40 defining a mounting flange 42 with an aperture 41 for securing the bracket 40 to the vehicle. Footrest 30 could also be molded of a reinforced polymeric material. Each L-shaped end of bracket 40 integrally includes a downwardly extending leg 46 and 48 joined to flanges 44 and 42, respectively, at reinforcing indentations 49 to add rigidity to the stamped steel bracket 40. The leg 22 of U-shaped footrest 30 curves outwardly at section 22' and then inwardly to define a center footresting leg 24 covered by an elastomeric material 25, such as sanaprene, which is conventionally employed for vehicle interior foot-contacting members, such as pedals. Material 25 is textured by spiral grooves 27 defining individual ridges 27' (FIG. 4) to provide a flexible cushioned feel to the user. Footrest 30 integrally includes a second leg 26 extending from the opposite end of center leg 24 outwardly at section 29 and then inwardly terminating in a flattened end 23 with an aperture for pivotally mounting the end 23 to bracket 40. This end of bracket 40 also has a mounting flange 44 with an aperture 43 therein for securing the bracket 40 to the vehicle seat mounting support 10. Extending between the individual mounting flanges 44 and 42 of bracket 40 is a tubular cross-support 46' providing rigidity to the mounting bracket. Also extending between the legs 22 and 26 of footrest 30 is a cross-support 28 also providing rigidity to the pivoted footrest assembly 20.

Footrest 30 is pivotally mounted to bracket 40 by means of a pair of rivets 50, 52, which extend through apertures, such as aperture 31 (FIG. 5), in the flattened ends 21, 23 of footrest 30 to allow the pivotal rotation of the footrest and yet provide enough friction between footrest 30 and mounting bracket 40 to hold the footrest in a stored position against the vehicle seat back, as shown in FIG. 1. The details of the connection between flange 44 of bracket 40 and leg 22 of footrest 30 is shown in FIG. 5.

Figure 2:
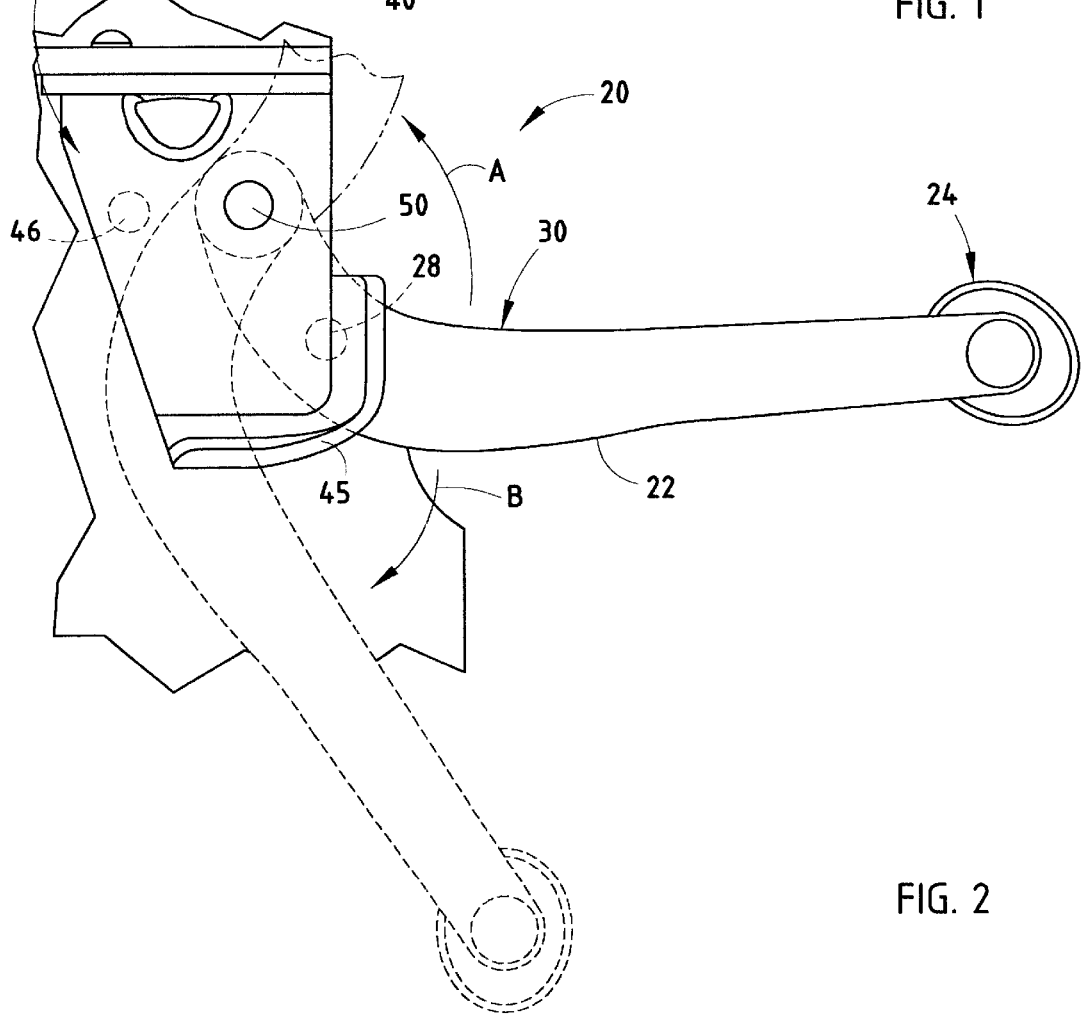
FIG. 2 is a greatly enlarged side elevational view of the footrest of the present invention shown partly in phantom form, in different positions.
Figure 5:
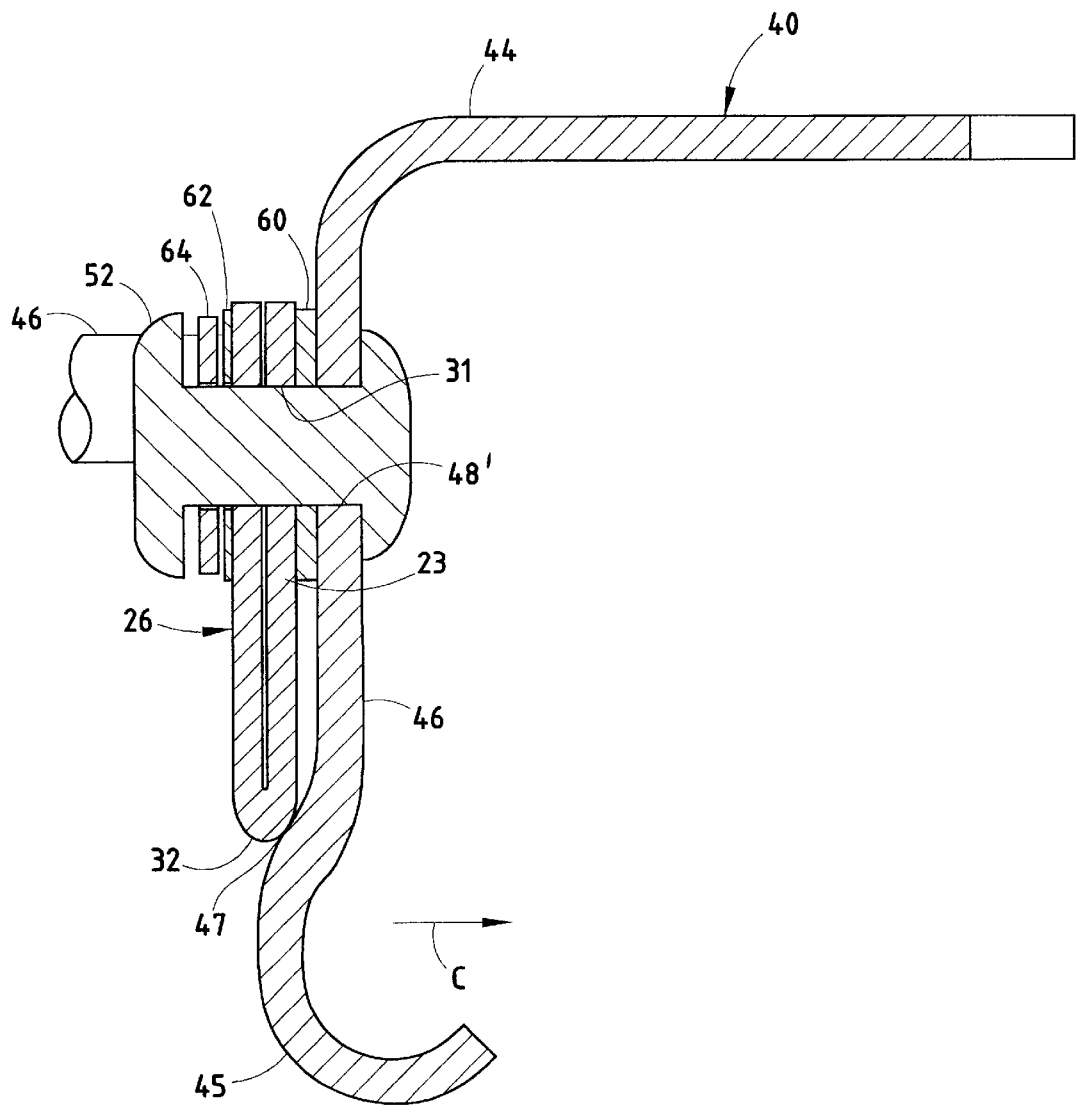
FIG. 5 is a cross-sectional view taken along section lines IV—IV of FIG. 4.

In FIG. 5, there is shown an aperture 48' in bracket 40 for receiving rivet 52 and a friction washer 60 interposed between the outer surface of bracket 40 and the end 23 of footrest 30. A flat washer 62 surrounds rivet 52 on the other side of end 23 of leg 26 and a spring washer 64 is positioned outside of washer 62. Washers 60, 62, and 64 are selected to provide, together with similar mounting structure for leg 26, control of the rotational torque of movement of the footrest 30 with respect to mounting bracket 40. This rotational coupling of footrest 30 to bracket 40 allows the footrest to be held in a raised stored position, as seen in FIGS. 1 and 2, and manually lowered to a use position in which legs 22 and 26 of footrest 30 engage bracket 40 to provide the breakaway action as now described.

As best seen in FIG. 5, the outer edge 32 of end 23 of footrest 30 engages an inwardly curved deformable stop 45 (FIGS. 2 and 5) of downwardly depending leg 46 of mounting bracket end 42 when the footrest is rotated to the use position. The inter-engagement between outer edge 32 and the surface 47 of end 45 defines a breakaway stop for holding the footrest in a use position. The opposite end 42 and leg 22 have a similar interference connection for securely holding the footrest in a use position. If, however, an excessive force of, for example, about 40 to about 80 newtons is applied to the center leg 24 of the footrest 30, leg 45 deflects in the direction indicated by arrow C in FIG. 5 to allow outer edge 32 to rotate therethrough permitting the footrest to breakaway to the floor-contacting position as shown in FIG. 1. The opposite end connection for leg 22 operates in the same manner. Subsequently, the footrest can be manually returned to the stop position illustrated in FIGS. 1 and 5 by lifting, using the center area 24 as a handle, the footrest to a use position or a stored position. Although the breakaway or deformable stop illustrated in the preferred embodiment is a deformable edge of the vertically extending legs of the ends 42 and 44 of mounting bracket 40, the breakaway interconnection can be achieved in other structural manners, such as by providing a dimple or projection on the ends 21, 23 of legs 22, 26 which engage the bracket 40 and deflect the downwardly depending legs to provide the desired breakaway effect.

Thus with the footrest of the present invention, a compact, easily stored footrest is provided which is relatively inexpensive and which provides second row passengers with comfortable footresting support while preventing damage to the footrest support by allowing its breaking away when excessive force is placed thereon. The footrest can be returned to use and a stored position by rotating the footrest in a direction opposite the breakaway direction. By providing a mounting bracket with an interference fit between the footrest and its mounting bracket, the rotational movement of the footrest can be controlled as can the breakaway force required to move the footrest from a use position to a broken-away position. By providing a configured elastomeric surface to the footresting section of the footrest, a comfortable footrest is provided at a relatively inexpensive cost for application in vehicles, such as automobiles, vans, and the like.

It will become apparent to those skilled in the art that various modifications to the preferred embodiment of the invention as described herein can be made without departing from the spirit or scope of the invention as defined by the appended claims.

The invention claimed is:

1. A breakaway footrest for a vehicle comprising:

a mounting bracket for securing to a vehicle seat mounting structure, said mounting bracket including a deformable element; and a footrest rotatably mounted to said mounting bracket for movement between a first stored position and a second use position and including an edge engaging said deformable element for deforming said deformable element to allow said footrest to move to a broken-away position when an excessive force is applied to said footrest.

2. The footrest as defined in claim 1 wherein said footrest is attached to said mounting bracket to allow said footrest to be held in a raised stored position and moved to a use position.

3. The footrest as defined in claim 1 wherein said footrest is a generally U-shaped member having a center leg and end legs integrally formed thereon.

4. The footrest as defined in claim 3 wherein said footrest is made of a tubular steel.

5. The footrest as defined in claim 4 wherein said bracket comprises a pair of generally L-shaped members coupled by a cross member.

6. The footrest as defined in claim 5 wherein said center leg is covered with an elastomeric material.

7. The footrest as defined in claim 6 wherein said elastomeric material has a textured surface.

8. The footrest as defined in claim 5 wherein opposite ends of said U-shaped footrest are coupled to said L-shaped member with a rivet to provide a functional coupling between said footrest and said mounting bracket.

9. The footrest as defined in claim 1 wherein said excessive force is from about 40 to about 80 newtons.

10. A breakaway footrest for a vehicle comprising:

a mounting bracket for securing to a vehicle seat mounting structure;

a footrest rotatably mounted to said mounting bracket for movement between a use position and a broken-away position; and a deformable element on one of said mounting bracket and said footrest and engaging the other of said footrest and mounting bracket to hold said footrest in a use position and allow said footrest to move to a broken-away position when a force of greater than about 40 newtons is applied to the footrest.

11. The footrest as defined in claim 10 wherein said bracket comprises a pair of generally L-shaped members coupled by a cross member.

12. The footrest as defined in claim 10 wherein said footrest is a generally U-shaped member having a center leg and end legs integrally formed thereon.

13. The footrest as defined in claim 12 wherein said bracket comprises a pair of generally L-shaped members coupled by a cross member.

14. The footrest as defined in claim 13 wherein said footrest is made of tubular steel.

15. The footrest as defined in claim 14 wherein opposite ends of said U-shaped footrest are coupled to L-shaped brackets with a fastener including a friction washer to hold said footrest in a raised stored position when not in use.

16. The footrest as defined in claim 14 wherein said center leg is covered with an elastomeric material.

17. The footrest as defined in claim 16 wherein said elastomeric material has a textured surface.

18. A footrest for a vehicle comprising:
- a mounting bracket including spaced-apart generally L-shaped ends coupled together by a cross member, said L-shaped ends including a flange for securing said bracket to a vehicle seat mounting structure;
- a generally U-shaped tubular footrest having ends pivotally mounted to respective L-shaped ends of said mounting bracket for movement between a stored position and a use position; and
- a deflectable stop, said L-shaped ends of said mounting bracket engaging said ends of said footrest to hold said footrest in a use position and allow said footrest to move to a broken-away position when a force of greater than about 40 newtons is applied to the footrest.

19. The footrest as defined in claim 18 wherein said footrest is attached to said mounting bracket to allow said footrest to be held in a raised stored position and moved to a use position.

20. The footrest as defined in claim 18 wherein said footrest is covered with an elastomeric material.

21. The footrest as defined in claim 20 wherein said elastomeric material has a textured surface.

22. The footrest as defined in claim 21 wherein said textured surface comprises spiral grooves and ridges formed in said elastomeric material.

* * * * *